United States Patent
Schröder et al.

(10) Patent No.: US 9,253,853 B2
(45) Date of Patent: Feb. 2, 2016

(54) METHOD FOR CONTROLLING A STREETLIGHT

(75) Inventors: Helmut Schröder, Wiesbaden (DE); Daniel Brand, Pulheim (DE)

(73) Assignee: SCHREDER S.A., Brussels (BE)

( * ) Notice: Subject to any disclaimer, the term of this patent is extended or adjusted under 35 U.S.C. 154(b) by 298 days.

(21) Appl. No.: 13/994,619

(22) PCT Filed: Dec. 17, 2010

(86) PCT No.: PCT/EP2010/070146
§ 371 (c)(1),
(2), (4) Date: Aug. 15, 2013

(87) PCT Pub. No.: WO2012/079652
PCT Pub. Date: Jun. 21, 2012

(65) Prior Publication Data
US 2013/0313992 A1 Nov. 28, 2013

(51) Int. Cl.
*H05B 37/04* (2006.01)
*H05B 37/02* (2006.01)

(52) U.S. Cl.
CPC ............ *H05B 37/02* (2013.01); *H05B 37/0281* (2013.01); *H05B 37/0218* (2013.01); *H05B 37/0227* (2013.01); *Y02B 20/42* (2013.01); *Y02B 20/72* (2013.01)

(58) Field of Classification Search
None
See application file for complete search history.

(56) References Cited

U.S. PATENT DOCUMENTS

| | | | |
|---|---|---|---|
| 2002/0185980 A1 | 12/2002 | Beij et al. | |
| 2008/0258637 A1 | 10/2008 | Leung | |
| 2008/0310850 A1* | 12/2008 | Pederson et al. | 398/135 |
| 2009/0066258 A1 | 3/2009 | Cleland et al. | |
| 2010/0253233 A1 | 10/2010 | Hamamotot et al. | |
| 2011/0085322 A1* | 4/2011 | Myer | 362/183 |
| 2013/0278146 A1* | 10/2013 | Wilsher et al. | 315/151 |
| 2014/0225533 A1* | 8/2014 | Park et al. | 315/307 |

FOREIGN PATENT DOCUMENTS

| | | |
|---|---|---|
| EP | 1 976 343 A1 | 10/2008 |
| WO | WO 98/28948 A1 | 7/1998 |
| WO | WO 02/35894 A1 | 5/2002 |

OTHER PUBLICATIONS

International Search Report (PCT/ISA/210) issued on Sep. 15, 2011, by the European Patent Office as the International Searching Authority for International Application No. PCT/EP2010/070146.
Written Opinion (PCT/ISA/237) issued on Sep. 15, 2011, by the European Patent Office as the International Searching Authority for International Application No. PCT/EP2010/070146.
International Preliminary Report on Patentability (Form PCT/IB/373 issued on Jun. 18, 2013 by the European Patent Office as the International Searching Authority for International Application No. PCT/EP2010/070146.

* cited by examiner

*Primary Examiner* — Tuan T Lam
(74) *Attorney, Agent, or Firm* — Buchanan Ingersoll & Rooney PC

(57) ABSTRACT

A method for controlling a streetlight that is provided to illuminate a portion of the street, the method being performed by a controlling device having a memory accessible by a processor which controls a steering module which steering module is operatively coupled to the streetlight.

15 Claims, 2 Drawing Sheets

METHOD FOR CONTROLLING A STREETLIGHT

The present invention relates to a method for controlling a streetlight.

The streetlight systems of particular interest to be controlled by the method according to the invention may vary widely but include by way of example, outdoor systems for streets, parking, and general area lighting, indoor systems for general area lighting (malls, arenas, parking, etc), and underground systems for roadways, parking, etc.

Traditional methods for controlling streetlights are relatively simple. Streetlights are normally turned on at night under the control of a photo sensor which may be located on the streetlight or nearby or via time based controllers. Because streetlights consume a considerable amount of energy, attempts have been made to reduce the energy consumption while maintaining a satisfactory lighting of the street.

Such advanced method for controlling streetlights is known from US2009066258, which discloses a method for manually measuring light levels and, based on the measurements, adjusting the light level. Because light intensity is measured at the installation and at regular intervals during the lifetime of these lights, the streetlights can be controlled to provide in an optimal illumination intensity over their lifetime thereby thus not over-illuminating the street and furthermore thereby not consuming more energy than required.

A disadvantage of the method for controlling streetlights as known in the prior art is that it is both costly and time-consuming to optimize and maintain the illumination intensity on the street.

The invention relates to a method for controlling a streetlight that is provided to illuminate a portion of the street, the method being performed by a controlling device comprising a memory accessible by a processor which controls a steering module which steering module is operatively coupled to said streetlight.

The method according to the invention comprises the steps of:
storing in said memory a predetermined maximum illumination intensity value Imax for said portion of the street;
storing in said memory a maximum illumination intensity output value Omax of said streetlight;
storing in said memory input/output values of said streetlight, said input values being control signals for said streetlight and said output values being corresponding percentages of said maximum illumination intensity output value of said streetlight;
storing in said memory a maintenance factor Mf of said streetlight, said factor being the percentage of decrease of maximum illumination intensity output over the lifetime of said streetlight;
storing and keeping up-to-date in said memory a running hours value RH of said streetlight;
storing in said memory a maximum running hours value Mrh of said streetlight thereby defining the lifetime of the streetlight;
calculating in said processor an actual percentage of said maximum illumination intensity output value % actual of said streetlight by the formula:

$$\% \text{ actual} = \left[100 - \left(Mf \times \left(\frac{Mrh - RH}{Mrh}\right)\right)\right] \times \left[\frac{Imax}{Omax}\right]$$

retrieving from said memory an actual control signal that corresponds to said calculated % actual; and
steering said streetlight using said steering module by transmitting said actual control signal to said streetlight.

The controlling method according to the invention does not require a feedback from a measurement to optimize and maintain the illumination intensity on the street. To obtain this effect, several data is stored in a memory and a formula is executed based on the stored data. The formula is established providing the effect that no measurement is required at the installation of the streetlight to obtain the optimal illumination intensity on the street. The formula is furthermore established to keep the illumination intensity constant over the lifetime of the streetlight. To this end the formula comprises two main factors, one factor relating to the illumination output of the streetlight and the illumination on the street, and the other factor taking the running hours and the maximum lifetime of the streetlight into account. Thereby the first factor results in an optimal illumination intensity at the installation of the streetlight. The second factor results in that maintenance including measurements is not necessary to keep the illumination output constant over time because the decrease of illumination output is automatically taken into account. Both effects are realizable without measurements of the illumination on site.

Preferably, the method according to the invention further comprises:
storing in said memory an illumination percentage % ill for said portion of the street, which is the percentage of said predetermined maximum illumination intensity value Imax;
the formula for calculating said actual percentage being:

$$\% \text{ actual} = \left[100 - \left(Mf \times \left(\frac{Mrh - RH}{Mrh}\right)\right)\right] \times \left[\frac{Imax \times \% \text{ ill}}{Omax}\right].$$

The illumination percentage being integrated in the formula provides in an easy and transparent way to obtain the wanted illumination on the street. The factor is integrated in the formula so that it represents a percentage relative to the maximal illumination intensity for which the streetlight is designed. Thereby, it is easy to correctly adjust the illumination output of the streetlight even by a non-skilled person.

Preferably, said controlling device further comprises a communication module, the method further comprising: updating at least one parameter in the memory via said communication module. The communication module allows the streetlight controller to be amended from a distance via a communication network for example via the internet. Particularly when amending the illumination percentage %ill, such communication module provides in an advantage that depending on external parameters such as traffic density and weather, which are not directly linked to the streetlight, the illumination output can be amended.

Preferably, said controlling device further comprises a clock, the method further comprises:
storing in said memory time values at which said streetlight is to be switched on and off;
switching on and off said streetlight at said time values.

When the controlling device comprises a clock, there is no need for an external intervention to switch on and off the streetlight. Furthermore, in practice such switching on and off is arranged in groups, whereby multiple streetlights are illuminated at once. This creates peaks in electrical consumption. Furthermore, depending on effective location of a streetlight, the ideal switch on and switch off time values might differ.

To optimize power consumption, it will be advantageous to have the possibility to, for each streetlight individually, determine an optimal time value to switch on and off the light. Providing the controlling device with a clock enables the latter possibility.

Preferably, said switching on said streetlight comprises two steps:
for a predetermined warm-up time, steering said streetlight using said steering module to transmit a control signal relating to a maximum illumination intensity output so that for said predetermined time, said streetlight can warm up;
after said predetermined warm-up time, steering said streetlight using said steering module to transmit said actual control signal to said streetlight.

Performing the switching on of the streetlight in these two steps results in a higher efficiency and a longer lifetime of the streetlight.

The invention will now be described in more details with respect to the drawings illustrating some preferred embodiments of the invention. In the drawings.

In the drawings a same reference number has been allocated to a same or analogous element.

Figure 1:
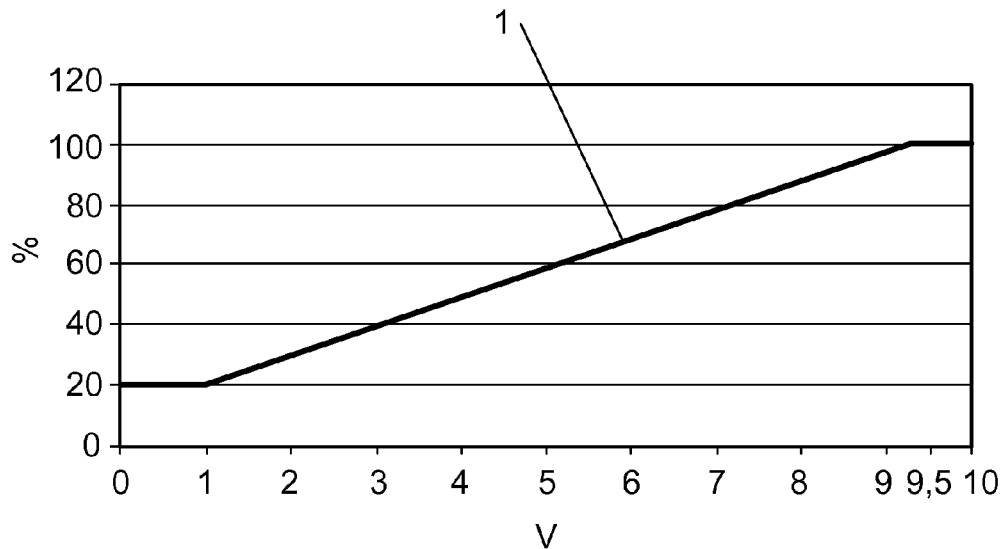
FIG. 1 shows a graph with the luminous flux output of a light in function of the control voltage of the light.

FIG. 1 shows a graph with a luminous flux output defined as a percentage % of the maximum luminous flux output of that light (on the vertical axis) in function of the control voltage V (on the horizontal axis). This particular graph is shown as an example and relates to a Philips Dynavision 70 W SON Ballast. The graph shows the specific relation 1 between control voltage V and the percentage of luminous flux output of the light % (hereafter: V-%-relation), however such V-%-relation 1 can also be contained by a table or by a formula. The graph shows how the V-%-relation 1 is not a linear relation where 0V relates to 0%, 1V to 10%, 2V to 20%, 9V to 90% and 10V to 100%, but is a more complex relation. Therefore to be able to correctly control the luminous flux output of the lamp, the V-%-relation 1 is to be taken into account.

The luminous flux output of a light % in percentage of the maximum luminous flux output of that light, results in an effective luminous flux output that depends on the wattage of that lamp. For example, when using a 70 W lamp, when the luminous flux output percentage is 100%, then the 70 W lamp shines at its full capacity outputting 70 W of light. When using a 100 W lamp, when the luminous flux output is in percentage is 100%, the 100 W lamp shines at its full to capacity outputting 100 W of light. When using a 70 W lamp, when the luminous flux output in percentage is 50%, then the 70 W lamp shines thereby outputting 35 W of light. When using a 100 W lamp, when the luminous flux output in percentage is 50%, then the 100 W lamp shines thereby outputting 50 W of light. This working with percentages provides in a transparent and easy to understand manner for marking the luminous flux output of a light.

At the design process of streetlights and streetlight armatures, the designers may not always consider whether the lamps to be used in their design are technically available. For example, it might turn out that optimally, a 87 W lamp is to be placed in the streetlight armature to obtain a predetermined maximum illumination intensity value on the street. Such 87 W lamp is not available on the market and as a result, a 100 W lamp is to be placed in the streetlight armature to provide a sufficiently high luminous flux output. However such 100 W lamp, controlled to shine at 100% of its capacity, consumes more electrical power than necessary.

The above-mentioned problem arises when there is a difference between on one hand the maximum illumination intensity value of the lamp Omax and on the other hand the predetermined maximum illumination intensity value Imax that is wanted on the street. To compensate for this difference, the formula in the present invention comprises a static compensation factor SCF, where $$SCF = \left[\frac{Imax}{Omax}\right].$$

It is named a static compensation factor because the compensation does not depend on a time factor.

Figure 2:
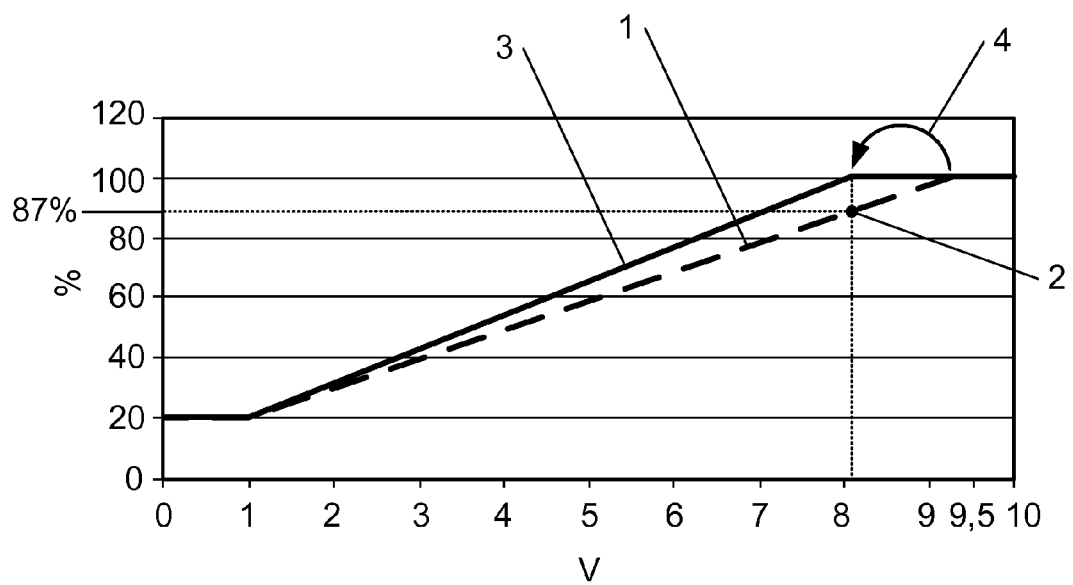
FIG. 2 shows an amended graph in which a first correction is shown.

FIG. 2 illustrates the effect of such static compensation factor SCF on the V-%-graph of FIG. 1. FIG. 2 shows the V-%-relation 1 of the lamp. On this first V-%-relation 1, the point 2 where the lamp outputs 87% (since a 100 W lamp is used, 87% is equal to 87 W) is marked and the control voltage V of that point 2 is defined in a new V-%-relation 3 as the 100% value. Thereby, the 100%-point of the V-%-relation moves according to arrow 4. When according to the new V-%-relation 3 the control value of 100% is determined, the lamp which is a 100 W lamp will only output 87 W. Thereby, the over-dimension of the lamp has been compensated by the SCF.

The illumination intensity output of a streetlight decreases over the lifetime of that streetlight. This in practice may have one of two effects. A first effect is that the lamp is over-dimensioned so that at the end of its lifetime, it still provides enough light. Such over-dimensioning however has as a result that in the beginning of the lifetime of the lamp, the lamp consumes too much power because its illumination intensity value is too high or at least higher than necessary. A second effect is that the lamp is not over-dimensioned so that at the beginning of the lifetime, it does not consume too much energy. However at the end of the lifetime, the lamp does not produce an illumination intensity value that is high enough.

The above-mentioned problem is solved by introducing a further factor in the formula according to the invention, referred to as the dynamic compensation factor DCF. The DCF comprises a time-related factor and is therefore named dynamic. This time-related factor is established in such a manner that at the beginning of the lifetime of the lamp, the over-dimensioning of the lamp is compensated so that the lamp outputs an illumination intensity value as if the lamp were not over-dimensioned. The time-related factor is also established in such a manner that at the end of the lifetime of the lamp, no over-dimensioning compensation is made so that the lamp, at that time value, also outputs a predetermined maximum illumination intensity value. To this end, the time-related factor comprises a factor relating to the actual running hours RH and comprises a factor relating to the maximum lifetime expressed in running hours Mrh. Furthermore, the time-related factor comprises a factor relating to the percentage of maximum decrease of illumination intensity over the lifetime of the lamp, also referred to as the maintenance factor Mf. The dynamic compensation factor DCF in the formula is formed:

$$DCF = \left[100 - \left(Mf \times \left(\frac{Mrh - RH}{Mrh}\right)\right)\right].$$

Thereby, when the lamp is at the beginning of its lifetime, being at running hours RH=0, than the formula will be $$DCF = \left[100 - \left(Mf \times \left(\frac{Mrh - 0}{Mrh}\right)\right)\right]$$
$$= [100 - (Mf \times 1)]$$
$$= [100 - Mf].$$

This has as a result that at the beginning of the lifetime, the illumination intensity of the lamp is decreased by the percentage of maximum decrease over the lifetime of the lamp thereby thus compensating the over-dimensioning of the lamp. When the lamp is at the end of its lifetime, being at the moment where the running hours RH is equal to the maximum running hours Mrh, thus where RH=Mrh. In the formula, this will result in $$DCF = \left[100 - \left(Mf \times \left(\frac{Mrh - Mrh}{Mrh}\right)\right)\right]$$
$$= [100 - (Mf \times 0)]$$
$$= 100.$$

This has as a result that at the end of the lifetime of the lamp, the illumination intensity of the lamp is not decreased by the dynamic compensation factor since the outcome of the formula is 100%.

Figure 3:
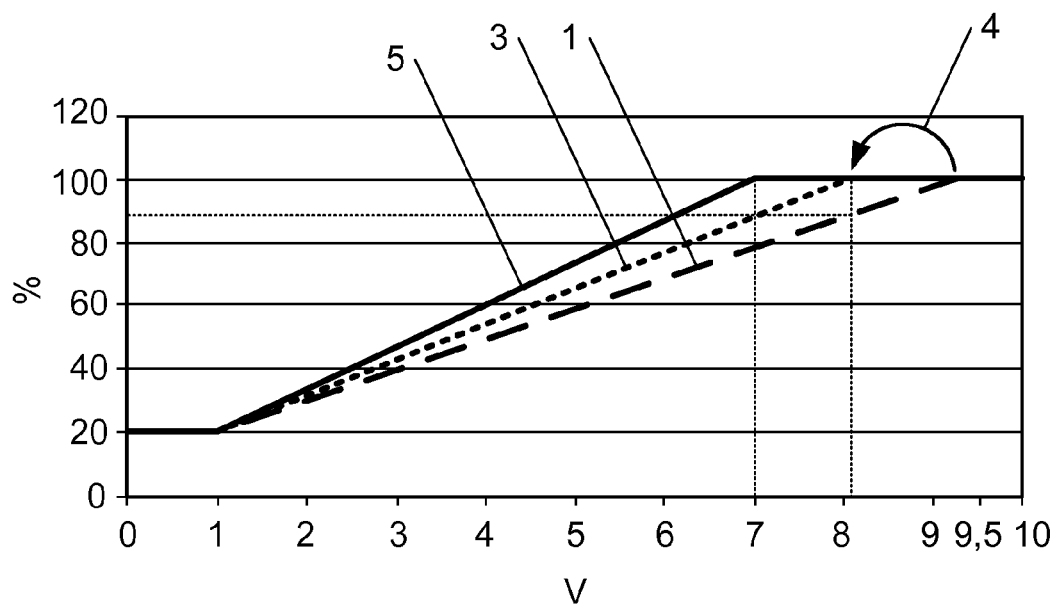
FIG. 3 shows a further amended graph in which a second correction is shown.

FIG. 3 illustrates the effect of such dynamic compensation factor DCF on the V-%-graph of FIGS. 1 and 2. The figure shows a further V-%-relation 5, which is the V-%-relation at the beginning of the lifetime of the lamp where the maintenance factor is determined at 13%. The V-%-relation 3, which is determined in FIG. 2, is relevant at the moment of the end of the lifetime of the lamp. This having different V-%-relations at the beginning and at the end of the lifetime has as a result that a request of 100% illumination in the beginning results in a control value of 7V while a request of 100% illumination at the end of the lifetime results in a control value of 8V.

The formula according to the invention preferably comprises a further factor relating to the percentage of illumination intensity value % ill that is requested. By default, the factor % ill is set at 100%. However this factor provides a possible way to easily amend the illumination intensity. For example in periods where there is less traffic, this % ill factor can be set at 80% so that when the light are turned on, the lamps only provide an illumination intensity which is 80% of the usual 100% for which the lamps are designed.

The formula which is used to determine the percentage of illumination intensity value % actual according to the invention is a combination of the DCF, the SCF and the % ill factor and is:

$$\% \text{ actual} = \left[100 - \left(Mf \times \left(\frac{Mrh - RH}{Mrh}\right)\right)\right] \times \left[\frac{Imax}{Omax}\right] \times \% \text{ ill}.$$

This % actual is the percentage of actual illumination intensity that is wanted with respect to the maximum illumination intensity that can be provided by the lamp. After this percentage % actual has been determined, a control voltage is to be determined at which control voltage the lamp outputs this percentage. This control voltage can be determined because the relationship between control voltage and the percentage of illumination intensity output is known. This relationship is shown in FIG. 1-3 with the V-%-relation 1. As explained above, this relationship can also be saved in the form of a table.

In the method according to the invention, the factors that are used in the formula are first determined and stored in a memory. Also the V-%-relation 1 is stored in a memory. Then % actual is calculated using the formula explained above. With the outcome of the formula, a control value is determined that corresponds to the % actual. This control value is used to steer the streetlight thereby obtaining the optimal illumination intensity on the street.

Figure 4:
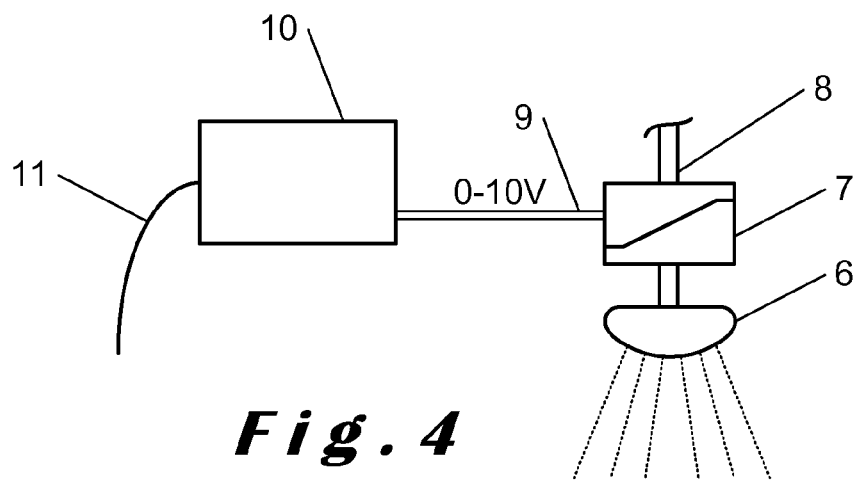
FIG. 4 shows a scheme explaining the elements for executing the invention.

FIG. 4 shows a setup which can be used to run the method according to the invention. FIG. 4 shows a lamp 6 being coupled to a steerable ballast 7 having a power input 8 and a control signal input 9. The lamp 6 and the steerable ballast 7 can be also integrally formed. The control signal input 9 is coupled to a controlling device 10. The controlling device 10 comprises a memory for storing in the memory the factors that are used in the formula, a processor provided to execute the formula, and control-signal means for generating the control signal. In the present example, the control signal is in the form of a 0-10V voltage, however other control signals including digitally encoded signals can be used as well.

Preferably, the controlling device is coupled to a network via a communication module 11. Via the communication module, factors that are stored in the controlling device can be updated. For example the % ill factor can be changed via the communication module based on the actual situation and illumination needs.

Preferably, the controlling device comprises a counter to count the running hours RH of the lamp. Thereby, the counter only counts the hours when the lamp is activated. The counter updates the running hours RH value in the memory to keep this value up-to-date, Preferably, the controlling device comprises a clock, more preferably an atomic clock, Furthermore, the memory preferably comprises time values stored therein at which time values the lamp is to be switched on and off. The method according to the invention preferably comprises a step to switch on and off the streetlight at the corresponding stored time value.

To enhance the lifetime of the lamp, when switching on the lamp, the lamp should be illuminated at its maximum for at least a predetermined warm-up period. This is implemented in the method according to the invention by, after switching on the lamp, controlling the lamp to its maximum illumination level. After the warm-up period, the lamp is controlled to illuminate at the illumination level which is calculated using the formula.

The invention claimed is:

1. A method for controlling a streetlight that is provided to illuminate a portion of a street, the method being performed by a controlling device having a memory accessible by a processor which controls a steering module, which steering module is operatively coupled to the streetlight, the method comprising:

storing in said memory a predetermined maximum illumination intensity value Imax for said portion of the street;

storing in said memory a maximum illumination intensity output value Omax of said streetlight;

storing in said memory input/output values of said streetlight, said input values being control signals for said streetlight and said output values being corresponding percentages of said maximum illumination intensity output value of said streetlight;

storing in said memory a maintenance factor Mf of said streetlight, said factor being a percentage of decrease of maximum illumination intensity output over a lifetime of said streetlight;

storing and keeping up-to-date in said memory a running hours value RH of said streetlight;

storing in said memory a maximum running hours value Mrh of said streetlight thereby defining the lifetime of the streetlight;

calculating in said processor an actual percentage of said maximum illumination intensity output value % actual of said streetlight by a formula:

$$\% \text{ actual} = \left[100 - \left(Mf \times \left(\frac{Mrh - RH}{Mrh}\right)\right)\right] \times \left[\frac{Imax}{Omax}\right]$$

retrieving from said memory an actual control signal that corresponds to said calculated % actual; and steering said streetlight using said steering module by transmitting said actual control signal to said streetlight.

2. The method for controlling a streetlight according to claim 1, wherein the method comprises:

storing in said memory an illumination percentage % ill for said portion of the street, which is a percentage of said predetermined maximum illumination intensity value Imax;

a formula for calculating said % actual being:

$$\% \text{ actual} = \left[100 - \left(Mf \times \left(\frac{Mrh - RH}{Mrh}\right)\right)\right] \times \left[\frac{Imax}{Omax}\right] \times \% \text{ ill.}$$

3. The method for controlling a streetlight according to claim 1, wherein said controlling device comprises a communication module, the method comprising:

updating at least one parameter in the memory via said communication module.

4. The method for controlling a streetlight according to claim 1, wherein said controlling device comprises a clock, and the method comprises:

storing in said memory time values at which said streetlight is to be switched on and off; and switching on and off said streetlight at said time values.

5. The method for controlling a streetlight according to claim 4, wherein said switching on said streetlight comprises:

for a predetermined warm-up time, steering said streetlight using said steering module to transmit a control signal relating to a maximum illumination intensity output so that for said predetermined warm-up time, said streetlight will warm up; and after said predetermined warm-up time, steering said streetlight using said steering module to transmit said actual control signal to said streetlight.

6. The method for controlling a streetlight according to claim 2, wherein said controlling device comprises a communication module, the method comprising:

updating at least one parameter in the memory via said communication module.

7. The method for controlling a streetlight according to claim 2, wherein said controlling device comprises a clock, and the method comprises:

storing in said memory time values at which said streetlight is to be switched on and off; and switching on and off said streetlight at said time values.

8. The method for controlling a streetlight according to claim 3, wherein said controlling device comprises a clock, and the method comprises:

storing in said memory time values at which said streetlight is to be switched on and off; and switching on and off said streetlight at said time values.

9. The method for controlling a streetlight according to claim 7, wherein said switching on said streetlight comprises:

for a predetermined warm-up time, steering said streetlight using said steering module to transmit a control signal relating to a maximum illumination intensity output so that, for said predetermined warm-up time, said streetlight will warm up; and after said predetermined warm-up time, steering said streetlight using said steering module to transmit said actual control signals to said streetlight.

10. The method for controlling a streetlight according to claim 8, wherein said switching on said streetlight comprises:

for a predetermined warm-up time, steering said streetlight using said steering module to transmit a control signal relating to a maximum illumination intensity output so that, for said predetermined warm-up time, said streetlight will warm up; and after said predetermine warm-up time, steering said streetlight using said steering module to transmit said actual control signals to said streetlight.

11. An apparatus for controlling a streetlight that is provided to illuminate a portion of a street, the apparatus comprising:

a specially programmed processor for controlling a steering for module that, in operation, is coupled to the streetlight; and a memory accessible by the processor for non-transitory storing of a program for execution by the processor to control the streetlight via the steering module, the memory including:

a predetermined maximum illumination intensity value Imax for said portion of the street;

a maximum illumination intensity output value Omax of said streetlight;

input/output values of said streetlight, said input values being control signals for said streetlight and said output values being corresponding percentages of said maximum illumination intensity output value of said streetlight;

a maintenance factor Mf of said streetlight, said factor being the percentage of decrease of maximum illumination intensity output over the lifetime of said streetlight;

a running hours value RH of said streetlight;

a maximum running hours value Mrh of said streetlight thereby defining the lifetime of the streetlight; said processor being configured to perform steps of:

calculating an actual percentage of said maximum illumination intensity output value % actual of said streetlight a formula:

$$\% \text{ actual} = \left[100 - \left(Mf \times \left(\frac{Mrh - RH}{Mrh}\right)\right)\right] \times \left[\frac{Imax}{Omax}\right]$$

retrieving from said memory an actual control signal that corresponds to said calculated % actual; and steering said streetlight using said steering module by transmitting said actual control signal to said streetlight.

12. A controlling device for controlling a streetlight, having a steering module and a lamp, the controlling device comprising:
- a memory accessible by a processor which controls said steering module, said memory being operable for non-transitory storing of a program for execution by the processor to control the lamp via the steering module, the memory including:
  - a predetermined maximum illumination intensity value Imax for said portion of the street;
  - a maximum illumination intensity output value Omax of said streetlight;
  - input/output values of said street light, said input values being control signals for said streetlight and said output values being corresponding percentages of said maximum illumination intensity output value of said streetlight;
  - a maintenance factor Mf of said streetlight, said factor being a percentage of decrease of maximum illumination intensity output over a lifetime of said streetlight;
  - a running hours value RH of said streetlight;
  - a maximum running hours value Mrh of said streetlight thereby defining the lifetime of the streetlight; and
- a specially programmed processor for controlling the lamp via the steering module, the processor being configured to perform steps of:
  - calculating an actual percentage of said maximum illumination intensity output value % actual of said streetlight by a formula:

$$\% \text{ actual} = \left[100 - \left(Mf \times \left(\frac{Mrh - RH}{Mrh}\right)\right)\right] \times \left[\frac{Imax}{Omax}\right]$$

- retrieving from said memory an actual control signal that corresponds to said calculated % actual; and
  - steering said streetlight using said steering module by transmitting said actual control signal to said streetlight.

13. The controlling device according to claim 12, further comprising:
- a communication module through which parameters in said memory are updatable.

14. The controlling device according to claim 12, further comprising:
- a clock for providing time values at which said streetlight is switched on and off.

15. The controlling device according to claim 13, further comprising:
- a clock for providing time values at which said streetlight is switched on and off.

* * * * *